US 9,963,982 B2

(12) United States Patent
Zelesky

(10) Patent No.: US 9,963,982 B2
(45) Date of Patent: May 8, 2018

(54) CASTING OPTIMIZED TO IMPROVE SUCTION SIDE COOLING SHAPED HOLE PERFORMANCE

(71) Applicant: United Technologies Corporation, Hartford, CT (US)

(72) Inventor: Mark F. Zelesky, Bolton, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 402 days.

(21) Appl. No.: 14/823,370

(22) Filed: Aug. 11, 2015

(65) Prior Publication Data
US 2016/0069198 A1 Mar. 10, 2016

Related U.S. Application Data

(60) Provisional application No. 62/047,457, filed on Sep. 8, 2014.

(51) Int. Cl.
F01D 5/18 (2006.01)
F01D 9/02 (2006.01)
F01D 9/04 (2006.01)

(52) U.S. Cl.
CPC .......... *F01D 9/023* (2013.01); *F01D 5/186* (2013.01); *F01D 5/189* (2013.01); *F01D 9/041* (2013.01); *F05D 2250/314* (2013.01); *F05D 2250/712* (2013.01); *F05D 2260/201* (2013.01); *Y02T 50/672* (2013.01); *Y02T 50/676* (2013.01)

(58) Field of Classification Search
CPC ...................................................... F01D 5/186
USPC ........................................................ 416/97 R
See application file for complete search history.

(56) References Cited

U.S. PATENT DOCUMENTS

| 3,799,696 A | * | 3/1974 | Redman | F01D 5/189 415/115 |
| 4,118,146 A | * | 10/1978 | Dierberger | F01D 5/182 415/115 |
| 4,168,938 A | * | 9/1979 | Dodd | F01D 5/188 415/115 |
| 4,545,197 A | * | 10/1985 | Rice | F01D 5/185 60/39.58 |
| 4,565,490 A | * | 1/1986 | Rice | F01K 23/10 415/114 |
| 4,859,147 A | * | 8/1989 | Hall | F01D 5/186 415/115 |
| 5,342,172 A | * | 8/1994 | Coudray | F01D 5/186 416/95 |
| 5,392,515 A | * | 2/1995 | Auxier | B23P 15/04 29/463 |
| 5,624,231 A | | 4/1997 | Ohtomo et al. | |
| 5,688,104 A | | 11/1997 | Beabout | |

(Continued)

FOREIGN PATENT DOCUMENTS

| GB | 2262314 | 6/1993 |
| WO | 2013163150 | 10/2013 |

OTHER PUBLICATIONS

Extended European Search Report dated Feb. 25, 2016 in European Application No. 15183559.2.

*Primary Examiner* — Woody Lee, Jr.

(57) ABSTRACT

A gas turbine engine component includes a pressure side, a suction side, a leading edge, a trailing edge, an outer surface and an inner surface. The inner surface is positioned within the outer surface and defines a core. The inner surface has a first protrusion.

15 Claims, 7 Drawing Sheets

(56) References Cited

U.S. PATENT DOCUMENTS

| | | | | |
|---|---|---|---|---|
| 6,099,251 | A * | 8/2000 | LaFleur | F01D 5/147 415/115 |
| 6,241,469 | B1 * | 6/2001 | Beeck | B22F 7/004 415/115 |
| 6,997,676 | B2 * | 2/2006 | Koshoffer | F01D 5/146 415/115 |
| 7,520,725 | B1 * | 4/2009 | Liang | F01D 5/186 416/97 R |
| 7,946,815 | B2 * | 5/2011 | Liang | F01D 5/186 416/97 R |
| 8,167,559 | B2 * | 5/2012 | Liang | F01D 5/187 415/115 |
| 8,584,470 | B2 | 11/2013 | Zelesky et al. | |
| 9,797,261 | B2 * | 10/2017 | Tibbott | F01D 5/188 |
| 2001/0021343 | A1 * | 9/2001 | Kuwabara | F01D 5/187 415/115 |
| 2002/0172596 | A1 * | 11/2002 | Kohli | F01D 5/141 416/1 |
| 2003/0007864 | A1 * | 1/2003 | Shelton | F01D 5/186 415/115 |
| 2004/0197191 | A1 * | 10/2004 | Cunha | F01D 5/186 416/97 R |
| 2004/0253106 | A1 * | 12/2004 | Self | F01D 5/186 416/97 R |
| 2005/0135932 | A1 * | 6/2005 | Dodd | F01D 5/187 416/97 R |
| 2005/0186075 | A1 * | 8/2005 | Self | F01D 5/147 416/97 R |
| 2005/0214118 | A1 * | 9/2005 | Dodd | F01D 5/147 416/97 R |
| 2007/0048135 | A1 * | 3/2007 | Pietraszkiewicz | F01D 5/147 416/97 R |
| 2007/0116569 | A1 * | 5/2007 | Cunha | B22C 9/06 416/97 R |
| 2010/0254801 | A1 * | 10/2010 | Tibbott | F01D 5/186 415/115 |
| 2014/0033736 | A1 * | 2/2014 | Propheter-Hinckley | F01D 5/186 60/801 |
| 2016/0273365 | A1 * | 9/2016 | Slavens | F01D 5/186 |

\* cited by examiner

CASTING OPTIMIZED TO IMPROVE SUCTION SIDE COOLING SHAPED HOLE PERFORMANCE

CROSS REFERENCE TO RELATED APPLICATIONS

This application is a nonprovisional of, and claims priority to, and the benefit of U.S. Provisional Application No. 62/047,457, entitled "CASTING OPTIMIZED TO IMPROVE SUCTION SIDE COOLING SHAPED HOLE PERFORMANCE," filed on Sep. 8, 2014, which is hereby incorporated by reference in its entirety.

FIELD

The present disclosure relates generally to a gas turbine engine and more specifically to turbine blades and/or vanes exposed to high temperature.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and an electric generator to generate electrical power. These stator vanes and rotor blades are cooled by cooling holes through the surface of the vanes and blades.

The efficiency of the engine can be increased by passing a higher temperature gas flow through the turbine. However, the turbine inlet temperature is limited by the vane and blade (airfoils) material properties and the cooling capabilities of these airfoils. The temperature of the gas flow passing through the turbine progressively decreases as the rotor blade stages extract energy from the gas flow.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is described is a gas turbine engine component. The component includes a pressure side, a suction side, a leading edge, a trailing edge, an outer surface and an inner surface. The inner surface is positioned within the outer surface and defines a core. The inner surface has a first protrusion.

Also described is a gas turbine engine. The engine includes a compressor section, a combustor section and a turbine section. The turbine section includes a component that includes a pressure side, a suction side, a leading edge, a trailing edge, an outer surface and an inner surface. The inner surface is positioned within the outer surface and defines a core. The inner surface has a first protrusion.

Also described is a gas turbine engine component. The component includes a pressure side, a suction side, a leading edge, a trailing edge, an outer surface and an inner surface. The inner surface is positioned within the outer surface and defines a core. The inner surface has a first face positioned on the suction side. The first face has a first distance to the outer surface that is larger than a second distance to the outer surface. The second distance is positioned towards the leading edge from the first distance. The component also has a first cooling hole extending from the outer surface to the first face. The first cooling hole has a first metering axis that forms an angle between 15 degrees and 40 degrees with a first portion of the outer surface that is adjacent the first cooling hole.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
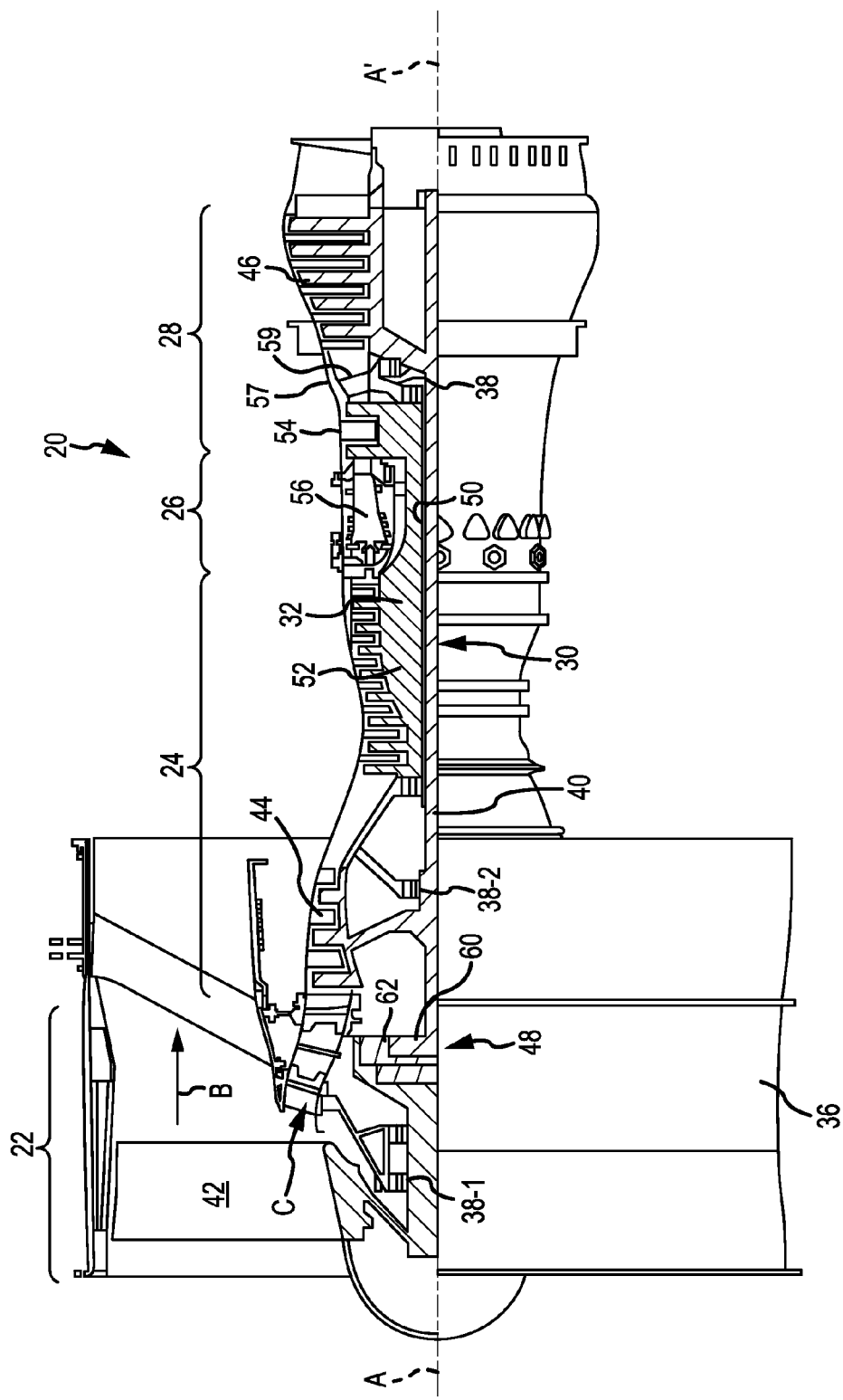
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency which requires higher pressure ratios and higher temperatures in high pressure compressor 52. These higher operating temperatures and pressure ratios may create operating environments that may cause thermal loads that are higher than the thermal loads which may shorten the endurance life of current components.

Figure 2:
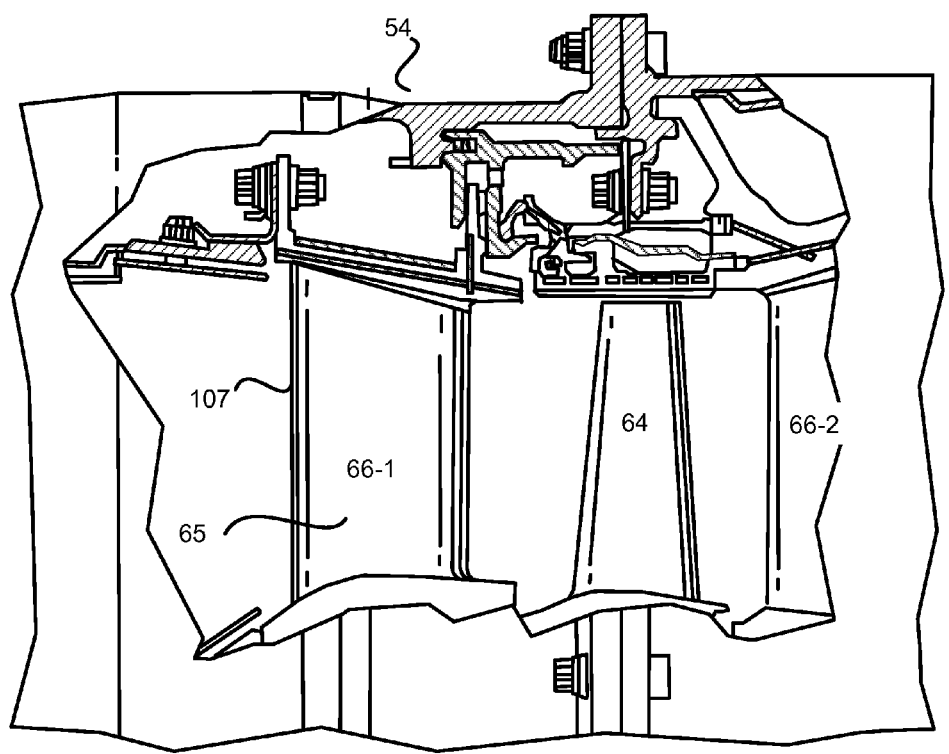
FIG. 2 illustrates a cross-sectional view of a portion of a high pressure turbine comprising a shrouded stator, in accordance with various embodiments.

In various embodiments and with reference to FIG. 2, high pressure turbine 54 may comprise alternating rows of rotors 64 and stators 66 (shown as stator 66-1 and stator 66-2 in FIG. 2). Stators 66 or rotors 64 may be simply supported or cantilevered and have a shrouded configuration as shown in FIG. 2. More specifically, stator 66-1 may comprise a stator vane 65, a casing support and a hub support. In this regard, stator vane 65 may be supported along an outer diameter by casing support and along an inner diameter hub support. In contrast, a cantilevered stator may comprise a stator vane that is only retained and/or supported at the casing (e.g., an outer diameter).

In various embodiments, rotors 64 may harvest energy from a fluid flow. Stators 66 may be configured to receive and straighten the fluid flow. In operation, the fluid flow discharged from the trailing edge of stators 66 may be straightened (e.g., the flow may be directed in a substantially parallel path to the centerline of the engine and/or HPT) to increase and/or improve the efficiency of the engine and, more specifically, to achieve maximum and/or near maximum energy harvesting and efficiency when the straightened air is received by rotors 64.

Figure 3:
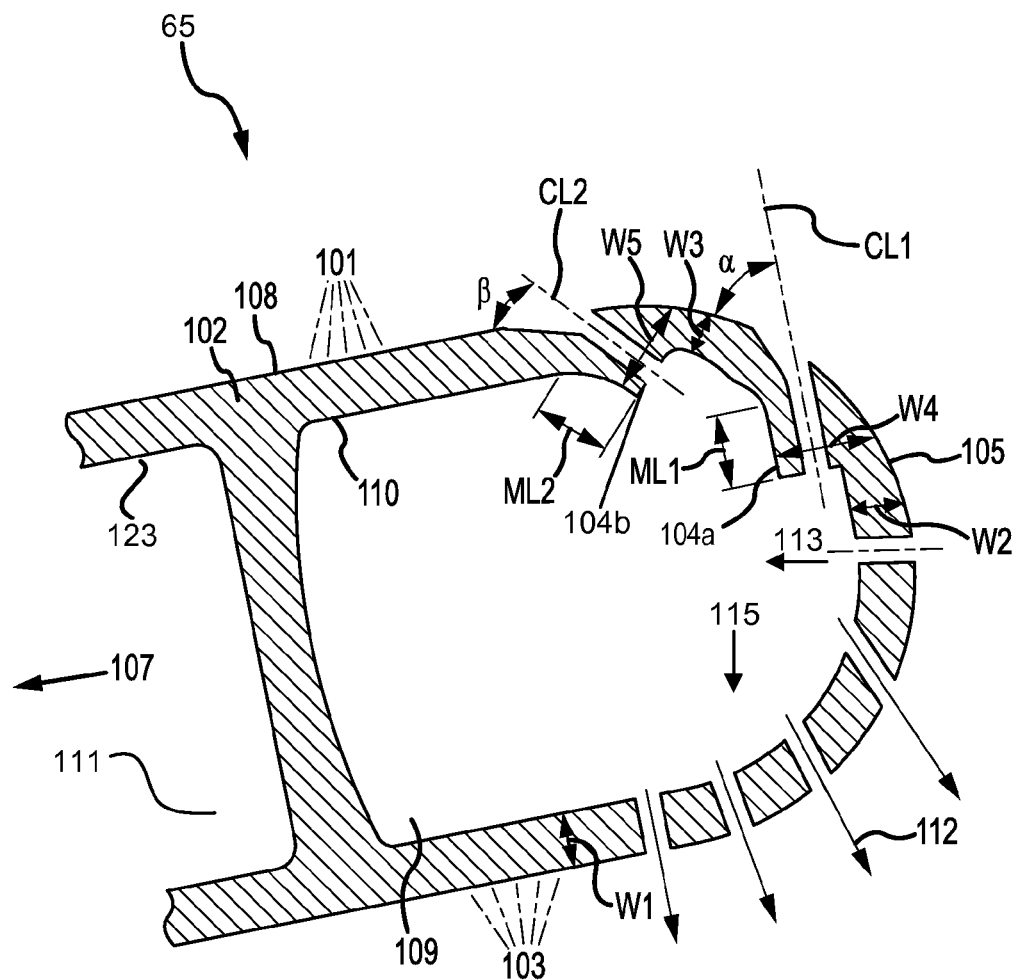
FIG. 3 illustrates an enlarged cross-section view of a portion of a vane in accordance with various embodiments.
Figure 4:
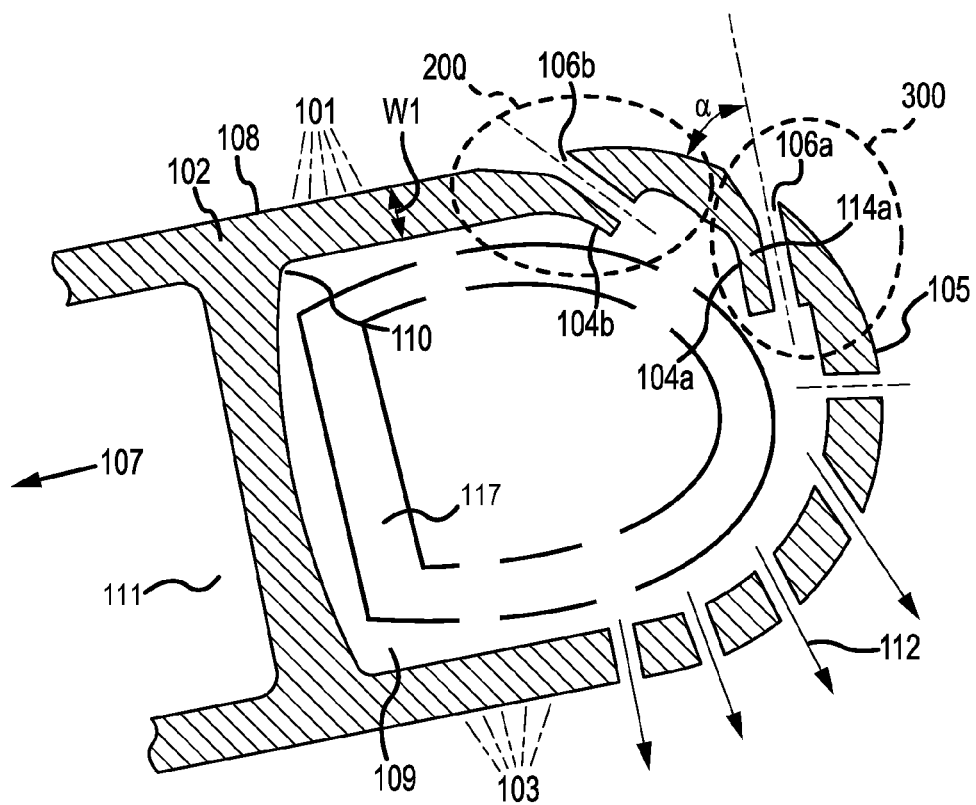
FIG. 4 illustrates the enlarged cross section view of the vane of FIG. 3 with a cooling tube in accordance with various embodiments.

FIGS. 3 and 4 illustrate an enlarged view of vane 65. FIG. 3 illustrates vane 65 without a cooling tube or insert and FIG. 4 illustrates vane 65 with a cooling tube or insert 117. Cooling tube or insert 117 is a tube or material insert that delivers cooling flow from an inner diameter or outer diameter region of vane 65 outside of the flowpath. The air flows into vane 65 within the cooling tube and discharges through impingement holes on the backside of vane 65. The impingement cooling causes convective heat transfer and cools vane 65 along with cooling from cooling holes.

While the discussion herein is directed to vane 65, one skilled in the art will appreciate that the systems and methods described herein may be consistent with stators or vanes within a turbine.

Vane 65 has a suction side 101, a pressure side 103, a leading edge 105 and a trailing edge 107. Leading edge 105 may reference the edge at which hot gas flow directly hits vane 65. Pressure side 103 is positioned in an area of higher pressure than suction side 101.

Vane 65 includes a wall 102 formed from a material such as a metal (e.g., a nickel or cobalt based super alloy, an austenitic nickel-chromium-based alloy such as Inconel® which is available from Special Metals Corporation of New Hartford, N.Y., USA, composite materials, and other suitable materials). Wall 102 includes an inner surface 110 and an outer surface 108. Inner surface 110 defines a leading edge core 109 of vane 65. Wall 102 may also include an inner surface 123 defining a trailing edge core 111. Outer surface 108 is disposed outward of and circumscribes leading edge core 109 and trailing edge core 111. In various embodiments, vane 65 may define any number of cores, including one, two, three, etc. For purposes of this disclosure, the term "inward" references a direction towards the center of leading edge core 109 (illustrated by arrow 113) and outward references a direction away from the center of leading edge core 109 (illustrated by arrow 115).

As shown, vane 65 includes inward extending protrusions 104a, 104b on inner surface 110. Inward protrusions 104 may be comprised of the same material as the rest of vane 65. Inward protrusions 104 can be formed, for example, at the same time as vane 65 or can be formed separately. Inward protrusions 104 and/or vane 65 can be formed using additive or subtractive manufacturing. For example, inward protrusions 104 and/or vane 65 can be formed using casting or internally machined using electrode discharge machining, chemical machining or convection machining. In various embodiments, any number of inward protrusions 104 can be included in vane 65. Inward protrusions 104 are not limited to extending within core 109, and can be formed within any core.

Figure 5:
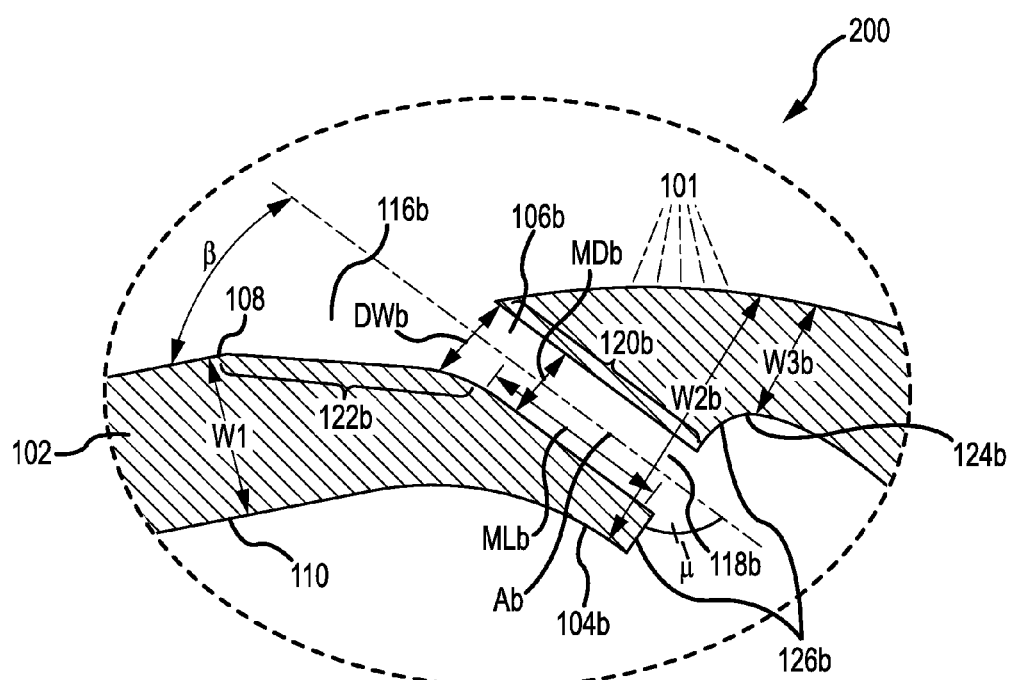
FIG. 5 illustrates an enlarged cross section view of a first cooling portion of the vane of FIG. 3 in accordance with various embodiments.

Continuing with FIG. 4 with reference to FIG. 5, wall 102 defines suction side cooling hole 106a, suction side cooling hole 106b, and pressure side cooling holes 112. In various embodiments, any number of suction side cooling holes 106 and any number of pressure side cooling holes 112 may be included in vane 65. Cooling holes 106 and/or cooling holes 112 can be made, for example, using an electrode discharge machine (EDM), laser drilling, or any other method of forming holes in wall 102. In various embodiments, vane 65 may be formed by additive manufacturing with cooling holes 106 and/or cooling holes 112 created by the additive manufacturing process. Cooling holes 106, 112 are discussed below in more detail.

Figure 6A:
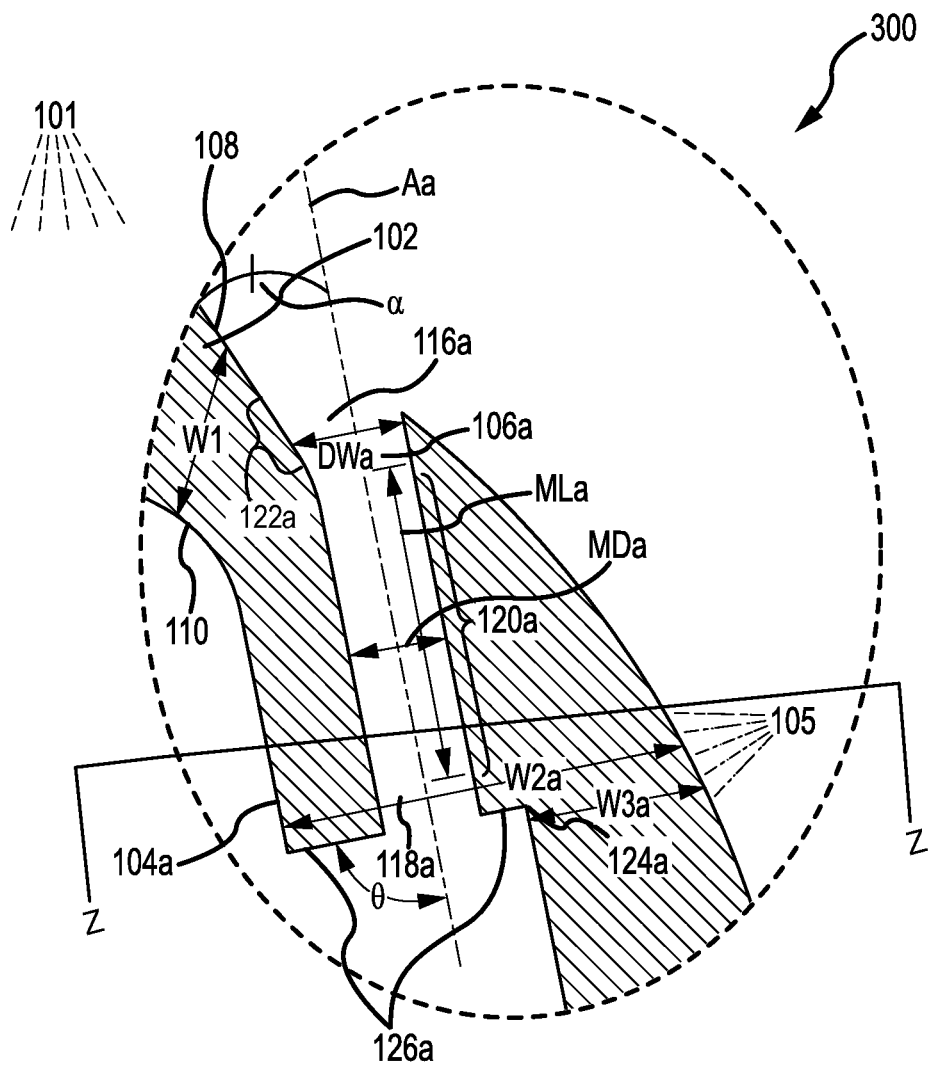
FIG. 6A illustrates an enlarged cross section view of a second cooling portion of the vane of FIG. 3 in accordance with various embodiments.

Typically, a wall of a vane or other airfoil has a constant width throughout, and includes an inner surface which is smooth. This width is set by various constraints, such as thermal properties of the component material, weight, etc. However, in accordance with various embodiments of the present disclosure, width W1 of wall 102 of vane 65 is not constant throughout. In certain locations along vane 65, less heat, pressure, etc. is applied to vane 65. Because of this, width W1 of wall 102 may be altered in certain locations in order to optimize cooling of vane 65 as illustrated in FIGS. 5 and 6A, which best illustrate, respectively, portion 200 of wall 102 around cooling hole 106b and portion 300 of wall 102 around cooling hole 106a.

Referring to FIG. 5, cooling hole 106b has a second opening 118b and a first, or chamfered, opening 116b. Cool (relative to the air temperature proximate pressure side 103 during typical operation) air enters cooling hole 106b, travels through cooling hole 106b, and through second opening 118b. First opening 116b is chamfered to increase air flow through cooling hole 106b.

Cooling hole 106b has a metering portion 120b having a meter length (length) MLb. Metering portion 120b also has a meter diameter MWb. Width MDb is generally constant throughout metering portion 120b, however, in various embodiments, width MDb may increase or decrease as it approaches first opening 116b. Metering portion 120 has an axis Ab. Metering portion 120 may have a circumference (radial to axis Ab) that has any shape, such as oval, circular, square, rectangular, etc. In various embodiments, metering portion 120b may be an internal diffuser.

Cooling hole 106b may also have an outer diffuser portion 122b. Diffuser portion 122b may have a width (width) DWb that increases as it approaches outer surface 108. Diffuser portion 122b may allow cool air to diffuse prior to entering the main gas path. Diffuser portion 122b may have a circumferential shape (radial to a central axis) that has any shape, such as oval, circular, flattened oval, square, rectangular, or complex shape as illustrated, for example, in U.S. Pat. No. 8,584,470 B2. Which is hereby incorporated by reference herein in its entirety. The shape of the circumference of diffuser portion 122b may change depending on the location along axis Ab. For example, the shape may be circular near metering portion 120b yet be oval near first opening 116b.

Generally, cooling holes in an airfoil are perpendicular to wall 102 on suction side 101. By defining cooling holes at an angle to wall 102, cooling holes can have increased length, and thus surface area, through wall 102. This extra surface area provides increased convection. Angled cooling holes also direct coolant towards leading edge 105 where vane 65 may be subject to a high level of heat. Including inward protrusions 104 into wall 102 facilitates the inclusion of angled cooling holes into wall 102, as cooling holes 106 can be drilled without scarfing inner surface 110.

Referring to FIGS. 3-6A as discussed above, inward protrusion 104b of wall 102 extends inward within leading edge core 109 on inner surface 110. Wall 102 has a width W2b (FIG. 5) at the end of inward protrusion 104b near an outwardly extending concavity 124b. Width W2b is larger than width W1. Inward protrusion 104b creates at least part of a wall 126b, or face, that partially faces towards leading edge 105 and/or pressure side 103. The positioning of wall 126b facilitates second opening 118b facing leading edge 105. Wall 126b may be a flat surface or may have curvature.

Inner surface 110 also defines an outwardly extending concavity 124b toward outer surface 108. In various embodiments, outward concavity 124b is adjacent inward protrusion 104b. Wall 102 has a width W3b at the beginning of outward concavity 124b nearest inward protrusion 104b that is smaller than width W1.

Width W1, W2 and W3 are sized for the pressure delta across wall 102. Pressure drop across wall 102 proximate outward concavity 124b is relatively small. Certain portions of wall 102 may be exposed to relatively large pressure differentials. Therefore, consideration of pressure delta across wall 102 must be taken into account when determining width W3b of outward concavity 124b.

In various embodiments, cooling hole 106b, inward protrusion 104b and outward concavity 124b may be positioned anywhere on suction side 101 of vane 65. For example, they may be positioned near leading edge 105, near trailing edge 107, near the middle, etc. Depending on the position of cooling hole 106b, inward protrusion 104b and outward concavity 124b, size, shape, angles, etc. of these elements will need to be altered based on pressure exposure, temperature exposure, curvature of inner surface 110 and/or outer surface 108, desired angle β, etc. In various embodiments, cooling hole 106b, inward protrusion 104b and outward concavity 124b are positioned on suction side 101 of vane 65 such that cooling hole 106b is positioned between suction side 101 and leading edge core 109. In various embodiments, cooling hole 106b, inward protrusion 104b and outward concavity 124b are positioned closer to leading edge 105 than trailing edge core 111.

In various embodiments, only inward protrusion 104b or outward concavity 124b may exist. In various embodiments, inward and/or outward concavity may be applied to wall 102 on pressure side 103 of vane 65.

Inward protrusion 104b and outward concavity 124b define wall 126b that defines second opening 118b. In various embodiments, only inward protrusion 104b may exist and define wall 126b. In various embodiments, only outward concavity 124b may exist and define wall 126b. Wall 126b may exist from an apex of inward protrusion 104b to an apex of outward concavity 124b.

Because of inward protrusion 104b and outward concavity 124b and the positioning of wall 126b, an angle $\mu$ between wall 126b and axis Ab can be large, nearing 90 degrees, while angle $\beta$ can be small, such as below 45 degrees. In various embodiments, angle $\mu$ can be larger or smaller than 90 degrees. If vane 65 were to not include inward protrusion 104b and/or outward concavity 124b, then angle $\beta$ would be limited to at least 45 degrees and above. However, inward protrusion 104b and/or outward concavity 124b allow angle $\beta$ to range from 15 degrees to 40 degrees. The facilitation of a lower angle $\beta$ allows the metering portion of cooling hole 106b to become elongated.

In various embodiments, inward protrusion 104b and/or outward concavity 124b may be designed such that they define wall 126b based on a desired angle $\beta$. In various embodiments, axis Ab may be perpendicular to wall 126b. In various embodiments, axis Ab may not be perpendicular to wall 126b.

In various embodiments, wall 126b is perpendicular to inner surface 110. In various embodiments, wall 126b may form an acute or obtuse angle with inner surface 110.

In FIG. 5, inward protrusion 104b has an angled edge that is near 90 degrees. In various embodiments, inward protrusion 104b may have an edge having an acute or obtuse angle. In various embodiments, inward protrusion 104b may be rounded instead of angled.

In FIG. 5, outward concavity 124b has a rounded edge. In various embodiments, outward concavity 124b may have an angled edge being 90 degrees, acute or obtuse.

Angle $\beta$ may be an angle less than 90 degrees. For example, in various embodiments, angle $\beta$ is between 15 degrees and 40 degrees. In various embodiments, angle $\beta$ is between 18 degrees and 30 degrees. In various embodiments, angle $\beta$ is between 18 and 20 degrees.

Because inward protrusion 104b and outward concavity 124b allow cooling hole 106b to be defined at an angle to wall 102, the performance of cooling hole 106b is improved. A ratio of a length of metering portion 120b (meter length MLb) to a diameter of metering portion (meter diameter MDb) determines performance of cooling hole 106b. Through a cooling hole, air flow requires a length of constant area (meter length) prior to diffusion. For example, if meter length MLb is less than two times meter diameter MDb, then performance of cooling hole 106b may become degraded. Continuing the example, if meter length MLb is less than meter diameter MDb, then performance of cooling hole 106b may become greatly degraded. These ratios are provided as an example only and do not necessarily represent the required ratio for degradation and great degradation. Cooling hole 106b may have a ratio of meter length MLb to meter diameter MDb that is greater than two and a half to one (2.5:1).

This determination of cooling hole 106b performance illustrates the importance of providing cooling holes defined at a greater angle to wall 102. If angle $\beta$ is large, then cooling hole 106b may be nearly perpendicular to inner surface 110 and outer surface 108. The more perpendicular cooling hole 106b is to wall 102 (i.e., the larger angle $\beta$ is), the more prone cooling hole 106b will be to blow off and lower film effectiveness. If cooling hole 106b is perpendicular to wall 102, meter length MLb will be relatively small (as it will be nearly the distance W1, which is relatively short). A relatively small meter length MLb will result in a smaller ratio of meter length MLb to meter diameter MDb. Because inward protrusion 104b and outward concavity 124b allow cooling hole 106b to be at an angle to wall 102, cooling hole 106b can extend for a longer distance between inner surface 110 and outer surface 108. This elongated distance of cooling hole 106b allows for meter length MLb to become larger, thus increasing performance of cooling hole 106b.

Referring now to FIG. 6A, cooling hole 106a has an outlet second opening 118a and an first opening 116a. Cool (relative to the air temperature proximate pressure side 103 during typical operation) air enters cooling hole 106a, travels through cooling hole 106a and exits through second opening 118a. First opening 116a is chamfered for improved coolant flow through cooling hole 106a.

Cooling hole 106a has a metering portion 120a having a meter length (length) MLa. Metering portion 120a also has a meter diameter MDb. Meter diameter MDb is generally constant throughout metering portion 120a, however, in various embodiments, meter diameter MDb may increase or decrease as it approaches first opening 116a. Metering portion 120 has an axis Aa. Metering portion 120 may have a circumference (radial to axis Aa) that has any shape, such as oval, circular, square, rectangular, etc. In various embodiments, metering portion 120a may be an internal diffuser.

Cooling hole 106a may also have an outer diffuser portion 122a. Diffuser portion 122a may have a width (width) DWa that increases as it approaches outer surface 108. Diffuser portion 122a may allow cool air to diffuse prior to entering the main gas path. Diffuser portion 122a may have a circumferential shape (radial to a central axis) that has any shape, such as oval, circular, flattened oval, square, rectangular, complex in shape as illustrated, for example, in U.S. Pat. No. 8,584,470 B2, which is hereby incorporated by reference herein in its entirety. The shape of the circumference of diffuser portion 122a may change depending on the location along axis Aa. For example, the shape may be circular near metering portion 120a yet be oval near first opening 116a.

Referring again to FIGS. 3-6A, as discussed above, inward protrusion 104a of wall 102 extends inward within leading edge core 109 on inner surface 110. Wall 102 has a width W2a (FIG. 6A) at the end of inward protrusion 104a near an outward concavity 124a. Width W2a is larger than width W1. Inward protrusion 104a defines at least part of a wall 126a (or face) that partially faces towards leading edge 105 and/or pressure side 103. Wall 126a may be a flat surface or may have curvature.

Inner surface 110 also defines an outwardly extending concavity 124a toward outer surface 108. In various embodiments, outward concavity 124a is adjacent inward protrusion 104a. Wall 102 has a width W3a at the beginning of outward concavity 124a nearest inward protrusion 104a that is smaller than width W1.

Width W1, W2 and W3 are sized for the pressure delta across wall 102. Pressure drop across wall 102 proximate outward concavity 124a is relatively small. Certain portions of wall 102 may be exposed to relatively large pressure differentials. Therefore, consideration of pressure delta across wall 102 must be taken into account when determining width W3a of outward concavity 124a.

In various embodiments, cooling hole 106a, inward protrusion 104a and outward concavity 124a may be positioned anywhere on suction side 101 of vane 65. For example, they may be positioned near leading edge 105, near trailing edge 107, near the middle, etc. Depending on the position of cooling hole 106a, inward protrusion 104a and outward concavity 124a, size, shape, angles, etc. of these elements will need to be altered based on pressure, temperature, curvature of inner surface 110 and/or outer surface 108, desired angle α, etc. In various embodiments, cooling hole 106a, inward protrusion 104a and outward concavity 124a are positioned on suction side 101 of vane 65 such that cooling hole 106a is positioned between suction side 101 and leading edge core 109. In various embodiments, cooling hole 106a, inward protrusion 104a and outward concavity 124a are positioned closer to leading edge 105 than trailing edge core 111.

In various embodiments, only inward protrusion 104a or outward concavity 124a may exist. In various embodiments, inward protrusions and/or outward concavities may be applied to inner pressure side 106 wall.

Inward protrusion 104a and outward concavity 124a define a wall 126a (or face) that defines second opening 118a. In various embodiments, only inward protrusion 104a may exist and form wall 126a. In some embodiments, only outward concavity 124a may exist and form wall 126a. Wall 126a may exist from an apex of inward protrusion 104a to an apex of outward concavity 124a.

Because of inward protrusion 104a and outward concavity 124a and the positioning of wall 126a, an angle θ (between wall 126a and axis Aa) can be large, nearing 90 degrees, while angle α is small, such as below 45 degrees. In various embodiments, angle θ can be larger or smaller than 90 degrees. If vane 65 were to not include inward protrusion 104a and/or outward concavity 124a, then angle α would be limited to at least 45 degrees and above. However, inward protrusion 104a and/or outward concavity 124a allow angle α to range from 15 degrees to 40 degrees. The facilitation of a lower angle a allows the metering portion of cooling hole 106a to become elongated.

In various embodiments, inward protrusion 104a and/or outward concavity 124a may be designed such that they define wall 126a based on a desired angle between cooling hole 106a and outer surface 108. In various embodiments, axis Aa may be perpendicular to wall 126a. In various embodiments, axis Aa may not be perpendicular to wall 126a.

In various embodiments, wall 126a is perpendicular to inner surface 110. In various embodiments, wall 126a may form an acute or obtuse angle with inner surface 110.

In FIG. 6A, inward protrusion 104a has an angled edge that is near 90 degrees. In various embodiments, inward protrusion 104a may have an edge having acute or obtuse angles. In various embodiments, inward protrusion may be rounded instead of angled.

In FIG. 6A, outward concavity 124a has a rounded edge. In various embodiments, outward concavity 124a may have an angled edge.

Angle α may be any angle less than 90 degrees. For example, in various embodiments, angle α is between 15 degrees and 40 degrees. In various embodiments, angle α is between 18 degrees and 30 degrees. In various embodiments, angle α is between 18 and 20 degrees.

Because cooling hole 106a can be defined at an angle to outer surface, performance of cooling hole 106a can be improved. A ratio of a length of metering portion 120a (meter length MLa) to a diameter of metering portion (meter diameter MDa) determines performance of cooling hole 106a. This is because through the cooling hole 106a, the air flow requires a length of constant area prior to diffusion. For example, if meter length MLa is less than two times meter diameter MDa, then performance of cooling hole 106a may become degraded. Continuing the example, if meter length MLa is less than meter diameter MDa, then performance of cooling hole 106a may become greatly degraded. These ratios are provided as an example only and do not necessarily represent the required ratio for degradation and great degradation. Cooling hole 106a may have a ratio of meter length MLa to meter diameter MDa that is greater than two and a half to one (2.5:1).

This determination of cooling hole 106a performance illustrates the importance of cooling hole 106a being defined at an angle to outer surface 108. The closer to perpendicular to outer surface 108 that cooling hole 106a is, the more prone cooling hole 106a is to film blow off and the less effective it will be. If perpendicular to outer surface 108 and inner surface 110, meter length MLa will be relatively small (as it will be nearly the distance W1, which is relatively short). A relatively small meter length MLa will result in a smaller ratio of meter length MLa to meter diameter MDa. Because inward protrusion 104a and outward concavity 124a allow cooling 106a to be defined at an angle to outer surface 108, cooling hole 106a can extend for a longer distance between inner surface 110 and outer surface 108. This elongated distance of cooling hole 106a allows for meter length MLa to become larger, thus increasing performance of cooling hole 106a.

In various embodiments, angle β or angle α may be partially limited by the curvature of outer surface 108. For example, on vane 65 illustrated in the FIGS., angle β can be larger than angle α because of curvature of outer surface 108. First opening 116b is adjacent to a flatter portion of outer surface 108 (i.e., a portion having less curvature) than first opening 116a, thus the curvature of wall 102 near first opening 116a limits the size of angle α more than the curvature of wall 102 near first opening 116b limits angle β.

Figure 6B:
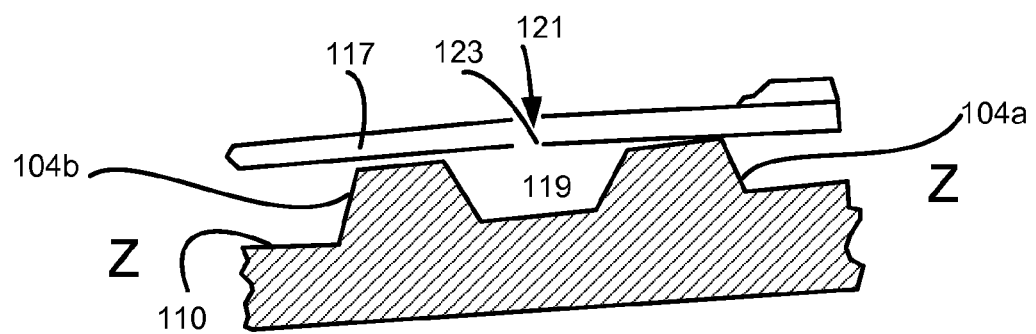
FIG. 6B illustrates a cross section view of a portion of a cooling tube positioned adjacent an inner surface of a cooling component in accordance with various embodiments.

FIG. 6B illustrates a cooling tube positioned adjacent an inner surface of a component in accordance with various embodiments. FIG. 6B illustrates that the inward protrusions 104 can be interrupted and act as a stand-off feature for cooling tube or insert 117. Component surface 119 is a portion of inner surface 110 that is positioned between inward protrusion 104b and inward protrusion 104a. Cooling tube or insert 117 includes a cooling hole 121. Cool air can flow in the direction of arrow 121 through cooling hole 121 and impinge surface 119 between the protrusions 104.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine component comprising:
    a wall having:
        an outer surface with a pressure side, a suction side, a leading edge, and a trailing edge, and
        an inner surface defining a core, and including:
            a first protrusion extending inwardly toward a center of the core,
            a first concavity extending outwardly away from the center of the core,
            a second protrusion extending inwardly toward the center of the core, and
            a second concavity extending outwardly away from the center of the core,
    wherein:
        the wall defines a first angled cooling hole from the suction side of the outer surface to the inner surface, and
        the wall defines a second angled cooling hole from the leading edge of the outer surface to a second face defined by the second protrusion and the second concavity.

2. The gas turbine engine component of claim 1, wherein the first protrusion defines a portion of the first angled cooling hole.

3. The gas turbine engine component of claim 2, wherein the second angled cooling hole is oriented transverse to the first angled cooling hole.

4. The gas turbine engine component of claim 1, wherein the first angled cooling hole includes a chamfered opening and a second opening facing the core.

5. The gas turbine engine component of claim 4, wherein the first angled cooling hole includes a metering portion through the wall, and the chamfered opening is configured as a diffuser.

6. The gas turbine engine component of claim 5, wherein the metering portion is configured about an axis which forms an angle between 15 degrees and 40 degrees with a portion of the outer surface adjacent the chamfered opening.

7. The gas turbine engine component of claim 6, wherein the angle is between 18 and 30 degrees.

8. The gas turbine engine component of claim 1, wherein the first concavity defines a portion of the first angled cooling hole.

9. The gas turbine engine component of claim 1, wherein the first protrusion extends toward the pressure side from the suction side.

10. The gas turbine engine component of claim 1, wherein the first protrusion extends toward the leading edge from the suction side.

11. A gas turbine engine assembly, comprising:
    a compressor section; and
    a turbine section including a component that includes:
        a wall having:
            an outer surface with a pressure side, a suction side, a leading edge, and a trailing edge, and
            an inner surface defining a core, and including:
                a first protrusion extending inwardly toward a center of the core,
                a first concavity extending outwardly away from the center of the core,
                a second protrusion extending inwardly toward the center of the core, and
                a second concavity extending outwardly away from the center of the core,
        wherein:
            the wall defines a first angled cooling hole from the suction side of the outer surface to the inner surface, and
            the wall defines a second angled cooling hole from the leading edge of the outer surface to a second face defined by the second protrusion and the second concavity.

12. The gas turbine engine assembly of claim 11 wherein the component is a stator vane in the turbine section.

13. A gas turbine engine component comprising:
    a wall having:
        an outer surface with a pressure side, a suction side, a leading edge, and a trailing edge, and
        an inner surface defining a core and including:
            a first protrusion extending inwardly toward a center of the core,
            a first concavity extending outwardly away from the center of the core,
            a second protrusion extending inwardly toward the center of the core, and
            a second concavity extending outwardly away from the center of the core,
    wherein:
        the wall defines a first angled cooling hole from the suction side of the outer surface to a first face defined by the first protrusion and the first concavity,
        an axis of the first angled cooling hole forms an angle with the outer surface that is between 15 degrees and 40 degrees, and the wall defines a second angled cooling hole from the leading edge of the outer surface to a second face defined by the second protrusion and the second concavity.

14. The gas turbine engine component of claim 13, wherein the first protrusion is adjacent to the first concavity.

15. The gas turbine engine component of claim 13, wherein the first angled cooling hole includes a chamfered opening and a second opening facing the core.

* * * * *